United States Patent [19]

Phelan et al.

[11] Patent Number: 4,993,627
[45] Date of Patent: Feb. 19, 1991

[54] ELECTRONICALLY CONTROLLED LOCKING MECHANISM

[76] Inventors: Michael D. Phelan, 100 Eagle Nest, Irving, Tex. 75063; Keith N. St. John, 2006 Sunset Ct. N., League City, Tex. 77573

[21] Appl. No.: 346,399
[22] Filed: May 2, 1989
[51] Int. Cl.⁵ .............................................. G06K 5/00
[52] U.S. Cl. .................... 235/382; 307/10.5; 340/825.31; 361/172
[58] Field of Search ........................ 235/382; 361/172; 307/10.2, 10.4, 10.5; 340/825.31

[56] References Cited

U.S. PATENT DOCUMENTS

| | | | |
|---|---|---|---|
| 3,059,070 | 10/1962 | Noregaard | 200/46 |
| 3,187,334 | 6/1965 | Humphrey | 346/34 |
| 3,520,161 | 7/1970 | Jacobi | 70/387 |
| 3,644,745 | 2/1972 | Bell | 307/10 |
| 3,651,464 | 3/1972 | Hedin et al. | 340/149 R |
| 3,660,624 | 5/1972 | Bell | 200/44 |
| 3,757,305 | 9/1973 | Hedin | 340/164 R |
| 3,870,895 | 3/1975 | Lax et al. | 307/10 AT |
| 4,050,063 | 9/1977 | Schull | 235/382 |
| 4,148,372 | 4/1979 | Schroeder | 180/114 |
| 4,222,034 | 9/1980 | Orenzow | 340/64 |
| 4,296,402 | 10/1981 | Szczepanski | 340/64 |
| 4,347,545 | 8/1982 | Weishaupt et al. | 361/172 |
| 4,366,466 | 12/1982 | Lutz | 307/10.5 |
| 4,379,966 | 4/1983 | Flies | 235/443 |
| 4,390,758 | 6/1983 | Hendrickson | 200/43 |
| 4,436,993 | 3/1984 | Flies | 235/382 |
| 4,438,426 | 3/1984 | Adkins | 340/64 |
| 4,545,343 | 10/1985 | Cook et al. | 307/10.5 X |
| 4,555,619 | 11/1985 | Anderson | 235/492 |
| 4,565,922 | 1/1986 | Anderson | 235/492 |
| 4,578,573 | 3/1986 | Flies et al. | 235/492 |
| 4,659,915 | 4/1987 | Flies | 235/441 |
| 4,686,358 | 8/1987 | Seckinger et al. | 235/382 |
| 4,835,407 | 5/1989 | Kataoka et al. | 361/172 X |
| 4,868,559 | 9/1989 | Pinnow | 361/172 X |
| 4,891,636 | 1/1990 | Rieker | 361/172 X |

Primary Examiner—David Trafton
Attorney, Agent, or Firm—Hubbard, Thurman, Tucker & Harris

[57] ABSTRACT

An electronic lock security system includes a coded key and a multiple position key receiver switch having a code sensing circuit for generating signals indicative of the key's code. A decoder compares the key's code to a preset code and when a match is determined outputs a control code to a switch control circuit. A switch control circuit includes flip-flops for remembering when switch positions intermediate the off and last positions have been accessed and output control signals upon receipt of the decoder's control signal. The flip-flop outputs are consecutively ANDed together down to the last position to permit operation of a power switch to provide working power to a solenoid operated device only when all positions of the multiple key receiver have been accessed during operation. For a typical automobile ignition switch having OFF, ACCESSORY, ON, and START positions, power switches are connected to the accessory and on positions outputs of the switch control for supplying power to solenoid operated devices. Also, to prevent connecting an auxiliary battery to the starter solenoid, or other methods of bypass such as hot wiring, etc., an enable switch circuit is provided for connection as closely as possible to the starter solenoid switch. The enable circuit produces a unique voltage for passage through a comparator to bias on a transistor switch connected in series with the starter's solenoid.

14 Claims, 4 Drawing Sheets

ELECTRONICALLY CONTROLLED LOCKING MECHANISM

This invention relates to electrically controlled locking mechanisms and more particularly to an improved electrically controlled locking mechanism having particular application to automotive ignition systems. Nevertheless, the invention is applicable to any application where it is desirable to limit access to a structure or area whose access is controlled by an electrically controlled lock system.

BACKGROUND OF THE INVENTION

In the past key actuated, electrically controlled mechanisms have included electrically coded keys, key receivers having code sensor circuits, and control circuitry responsive to proper code detection for outputting a control signal to switches controlling the operation of locks, ignition circuits and the like. One art system includes a coded key which when properly inserted in a key receiver type switch will be effective to unlock the system only if the appropriate key has been inserted. The key receiver switch has a code sensor circuit which senses the correct positioning of the key and the key code. The code is decoded in a decoder for comparison with a preset code in a comparator. If the codes match the comparator outputs a signal to a logic control circuit. The presence of the signal and a correct key position indicating signal enables the logic circuit to produce a control signal for an electrically actuated locking mechanism. Those persons desiring additional information for this prior art device are referred to U.S. Pat. No. 4,274,080 issued June 16, 1981 to Brunken.

A similar device is disclosed for burglar proofing vehicles and is disclosed in U.S. Pat. No. 4,347,545 issued Aug. 31, 1982 to Weishaupt et al. and assigned to Bayerische Motoren Werke A.G. (BMW).

Several types of coded keys have been used including magnetically coded keys, electro-optically coded keys, electrically coded keys, and a combination of electrically and mechanically coded keys. Such keys are the subject matter of U.S. Pat. Nos. 4,274,000; 3,870,895; 3,660,624; and 4,686,358.

Disadvantages attending the prior art devices are their failure to prevent known methods of bypassing the protective system using techniques including removal of the device during maintenance for copying, bypassing the mechanism by "hot wiring", or using auxiliary battery placement, for example.

The security system of the present invention is particularly suited for use in coded key ignition systems using any of the known coded key structures. Features which distinguish the present invention over the known prior art include: a structure suitable for use in connection with either electrically or mechanically coded keys; control lines having high current switching capability for driving directly the solenoids of solenoid operated devices; a sequentially driven control circuitry for ensuring that a proper sequence of events occur in the key receiver switch before final device actuation; an electrical identifier signal producer operable in response only to a key operation sequence for allowing the flow of current in a circuit path vital to system operation; and a code storage means which is configurable using either electrical or electronic means.

SUMMARY OF THE INVENTION

Accordingly it is an object of the invention to provide a security system substantially impervious to known tampering methods.

Another object of the invention is to provide a security system whose user operation is that of typical operational control systems such as automotive key operated ignition, and electrically operated lock systems.

Yet another object of the invention is to provide a security system having a high current control line for a solenoid operated device.

Still another object of the system is to provide a coded security system whose code entry or change is substantially facilitated by the use of known coding devices.

Briefly stated the electronic security system of the present invention provides security against the tampering of a multiple position key or combination operated system. The key or combination provides a code for the electronic security system. The electronic security system includes in a multiple position key receiver switch, a code sensing circuit for sensing the code. A first decision making circuit determines whether the code sensed matches a preset code for the multiple position key switch and if true outputs a control signal to a first action circuit. The first action circuit also is connected to the multiple position key switch for storing switch position accessed indicating signals and upon receipt of the control signal outputs currents at solenoid working levels for the solenoid controlled devices connected therethrough to each switch position and in addition for the last position a unique identification signal. A second decision making circuit determines whether the received identification signal is acceptable and if acceptable outputs a control signal to a second action circuit for connecting the solenoid working current to a selected solenoid operated device such as, for example, an automobile starter, CPU power points, spark plugs, etc. The identification signal circuit is connected as closely as possible to the starter solenoid to substantially reduce the length of leads available for an auxiliary battery to the starter.

BRIEF DESCRIPTION OF THE DRAWINGS

Other objects and features of the invention will become more readily apparent from the following detailed description when read in conjunction with the accompanying drawings, in which.

DETAILED DESCRIPTION OF A PREFERRED EMBODIMENT

Figure 1:
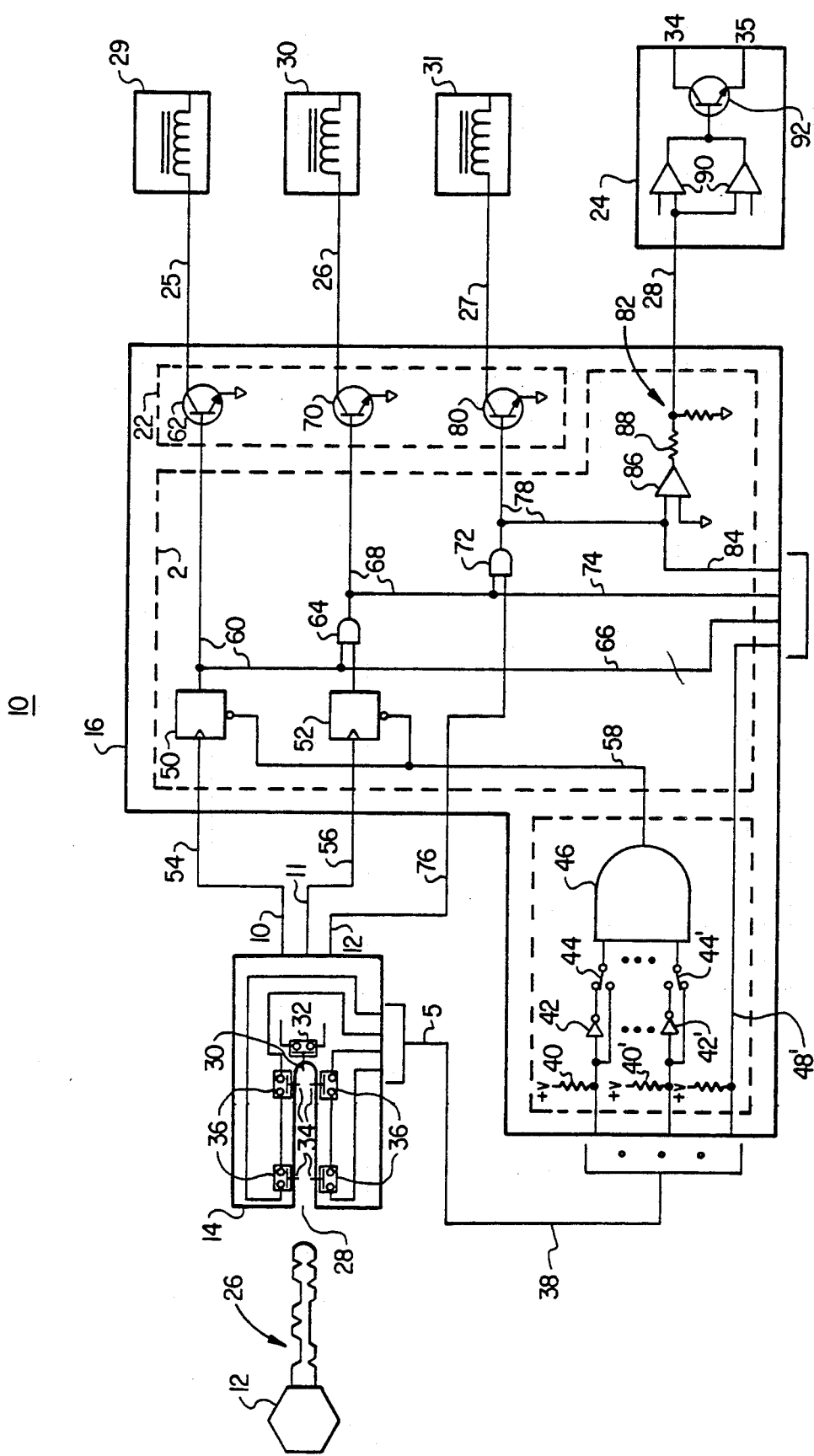
FIG. 1 is a schematic diagram, in block form, of the coded key system of the present invention including a first embodiment of the electronic control unit.

Referring now to FIG. 1 in which is shown for purposes of description only and not by way of limitation, a coded key ignition system 10 for an automobile having a typical multiple position ignition switch. The positions of the typical switch are, "Off, Accessory, On, and Start" positions. The coded key ignition system includes a coded key 12, multiple position key receiver switch 14, and electronic control unit 16 having a decoding circuit 18, control unit 20, power switching circuits 22, and starter enable circuit 24.

The coded key 12 may be either a mechanical or electrical coded key. If mechanically coded, the key is provided with a plurality of teeth formed by protrusions and depressions 26 positioned to form the key code. Its structure therefore resembles that of a typical automotive ignition key. If electrically coded without serrations, a code means such as magnets, for example, are positioned in a code forming relationship on the key's surface, or the key may include means within the key for producing electrically coded key signals formed by open or short bits. A safety notch (not shown) is provided for engaging a corresponding safety member located in the key port 26 of the key receiver switch for key retention during use.

The key port 28 has at a closed end a switch actuator of a power switch 30. The power switch is connected to a 12Vdc power source (the automobile battery). Thus, power is consumed by the system only when the key is inserted fully into the key port.

A code sensing circuit is used to sense the key code. The code sensing circuit includes a plurality of switch actuators 34 positioned along the cylindrical portion of the key port to correspond to the key code positions when the key is completely inserted. The switch actuators are connected to a plurality of code switches 36. The code switches 36 are normally open. However, when the mechanically coded key is inserted completely into the key port, power is connected to ground through those code sensor switches 36 which are closed by the protrusions of the key engaging their actuators; these closed switches produce logic zero level signals for the key code. The remaining switches are left open by the code key depressions to produce logic one level signals for the key code. Thus, a plurality of bits for an electrical digital code is generated using the code sensing circuit.

In an electrically coded key system, the switches 36 and switch actuators of the key receiver are not included; the key's open and short circuit outputs are connected directly to the decoder circuit 18 via bus 38.

Although the structure of FIG. 1, is for a four bit code it will be shown in FIGS. 2a-2f how the electronic control unit 16 may be constructed for a sixteen bit code using state of the art components. From these figures and their description it will be readily apparent to one skilled in the art how to provide circuitry for any number of code bits.

The multiple position key receiver switch 14 is a four position switch whose active positions (not shown) are connected to the 12Vdc power source in turn during rotation of the switch. The accessory, on, and start switch positions are connected to the electrical control unit 16 as hereinafter described.

The code bits of the multiple key receiver switch 14 are connected, for example, by leads of bus 38 to the decoding circuitry 18 of the electrical control unit 16. The decoding circuitry is for comparing the received key code to a preset code. The preset code device may consist of either a plurality of electrical switches or it can be established by a memory means such as a read only memory. Preferably, the decoding circuitry includes a plurality of electrical switches for the preset code as hereinafter described in detail. When the key code matches the preset code a control signal is output.

The decoding circuitry includes for each lead of bus 38 a 5Vdc power source connected to a pull up resistor 40. The pull up resistor is connected to the junction of an inverter 42 and first contact of a dual in line package (dip) switch 44. The inverter 42 is connected to a second contact of the dip switch 44. Each dip switch 44 is connected to an input terminal of AND gate 46.

In operation the preset code is entered into the plurality of dip switches 44. Dip switch 44 is set for its bit of the key's code to be a logic zero (switch 36 would be closed to ground to provide a logic zero signal). With the pole of switch 44 at the second contact the switch is positioned for the inverter to change the logic zero to a logic one and apply it to an input terminal of AND gate 46. Else, if switch 36 is open pull up resistor 40 would present a logic "1" to inverter 44 and the AND gate would receive a logic zero input. Conversely dip switch 44' is set for its bit of the key code to be a logic 1 (switch 36 would be open). Thus, with the pole of switch 44' at the first contact the switch is positioned for its pull up resistor 40' to present a logic one through switch 44 to an input of AND gate 46. Else, if the switch 36 is closed the logic zero (ground) would be connected to the input of AND gate 46. If the key's code matches the preset code, all logic one's are connected to the AND gate 44 and the AND gate outputs a logic 1 control signal. Else, AND gate 44 outputs a logic zero signal and the automobile ignition circuits will not be enabled for operation.

The key code can include an additional bit referred as a mode bit. The bit is connected by a status lead 48 to a vehicle's control processing unit (CPU). It is one of four status lines. The remaining three will be described hereinafter. Status lead 48 could have several applications. For example, one application is for a valet key. If the valet key's code matches the preset code and the vehicle's circuits enabled, the extra bit on status line 48 would be set and the CPU would not allow operation of the automobile over a set speed. Other application examples would be for limiting time or distance of operation, and a combination thereof to provide a motor governor for limiting the speed for a specified mileage for motor break in.

The control circuit 20 of the electronic control unit 16 includes data storing or remembering devices 50 and 52 connected, respectively, by leads 54 and 56 to the accessory and on positions of the key receiver switch for remembering selectively whether the accessory and on positions have been engaged and to the decoding circuitry by lead 58 for outputting the information only pursuant to the control signal outputs of AND gate 46. The output of the accessory switch position data storing or remembering device 50 is connected by lead 60 to the junction of a power switch 62 of the power switching device 22, a first logic device 64, and a second (accessory) mode status line 66. The output of the on switch position data storing or remembering device 52 is connected to the first logic device 64. The first logic device 64 is connected by lead 68 to the junction of a power switch 70 of the power switching circuit 22, a second logic device 72 and to a third (on) mode status line output 74. The second logic device is also connected by lead 76 to the start position of the key receiver switch 14. The output of the second logic device 72 is connected by lead 78 to the junction of a power switch 80 of the power switching circuit 22, a unique voltage producing device 82, and to a fourth (starter) mode status line output 84.

The power switching circuit 22 includes the plurality of power switches 62, 70, and 80. When activated by the first remembering device 50 and first and second logic means 64 and 72 these power switches generate working power for accessory, on (run), and starter solenoids, respectively. While the unique voltage producing device 82, which includes a difference amplifier 86 and a power divider 88, is connected to the serial enable circuit 24. The serial enable circuit 24, which includes a dual comparator 90 and a switch 92, is intended for serial placement in any critical vehicle circuit such as the starter, CPU, points, or spark plugs and controls the application of the starter solenoid power generated by the starter power switch 80 to the auto's starter. The comparator 90 determines whether the voltage applied thereto is the unique voltage. If yes, the switch 92 is closed and power passes to the starter or other aforementioned critical circuit. With the serial enable circuit located within the starter, it is almost impossible for an auxiliary battery to be used to power the starter. The status output lines 66, 74 and 84 are also for connection to the vehicle's central processing unit or other such circuitry. Thus, the status lines 66, 74 and 84 provide status signals to the CPU indicating the status of the accessory, on, and start positions of the four position key switch 14 for use by the CPU independently or in conjunction with the extra code bit status line 48.

Referring now to FIGS. 2a–2f for a description of a 16 bit key code electrical control unit and serial enable circuit.

Power Supply

The vehicle's 12Vdc power supply (FIG. 2a) is connected to the power application switch 32 of the key receiver switch 14 (FIG. 1), and the return from the switch is connected by lead 94 (FIG. 2a) to the junction of the power switching circuit 22 for supplying 12Vdc for the power switches 62, 64, and 66, and to a +5Vdc voltage regulator 96. A series of decoupling capacitors 98 are connected between the voltage regulator and ground to prevent any unwanted interstage frequency coupling to the +5Vdc power output. The 5Vdc output is for the solid state devices of the electronic control unit 16. A suitable voltage regulator is an LM109 manufactured by Grayhill Corporation.

Decoding Circuitry

For the 16 bit decoding circuitry 18 (FIGS. 2b and 2c), the bus 38 (FIG. 1) is a sixteen bit bus connected to a sixteen bit code sensing circuit of the key receiver or to receive the electrical key bits. To accommodate use of eight input, positive NAND gates the 16 bit leads are evenly divided and as each line circuit to the NAND gates is identical only one need be described. Each lead of a plurality of leads 100 for the first eight bits (bits 0–7) is connected to the junction of a pull up resistor 102, inverter 104, and a first contact of a dip switch 106. Suitable state-of-the-art inverter packages and dip switch packages are respectively, SN54LS04 hex inverter packages and 76-SC04 quad SPDT, dip switch packages sold by Grayhill Corporation. The inverter 104 has its output connected to a second contact of the dip switch 106. The pole of the dip switch is connected to an input terminal of a NAND gate 108. A suitable NAND gate is an SN54LS30J, eight input positive NAND gate sold by Grayhill Corporation. The output of the NAND gate 108 is connected to an inverter 110.

Similarly each lead 112 (FIG. 2c) for the second eight bits (bits 8–15) is connected to the junction of a pull up resistor 114, inverter 116 and first contact of a dip switch 118. The output of the inverter 116 is connected to a second contact of the dip switch 118. The pole of the dip switch 118 is connected to an input of an 8 input NAND gate 120. The output of the NAND gate 100 is connected to an inverter 122.

Figure 2A:
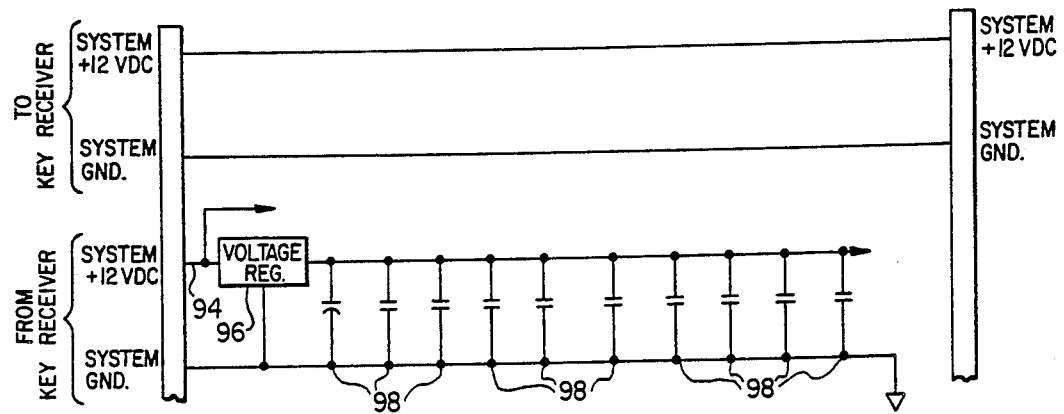
FIGS. 2a-2f constitute a schematic diagram showing a second embodiment of the electronic control unit of the coded key system of the present invention.
Figure 2B:
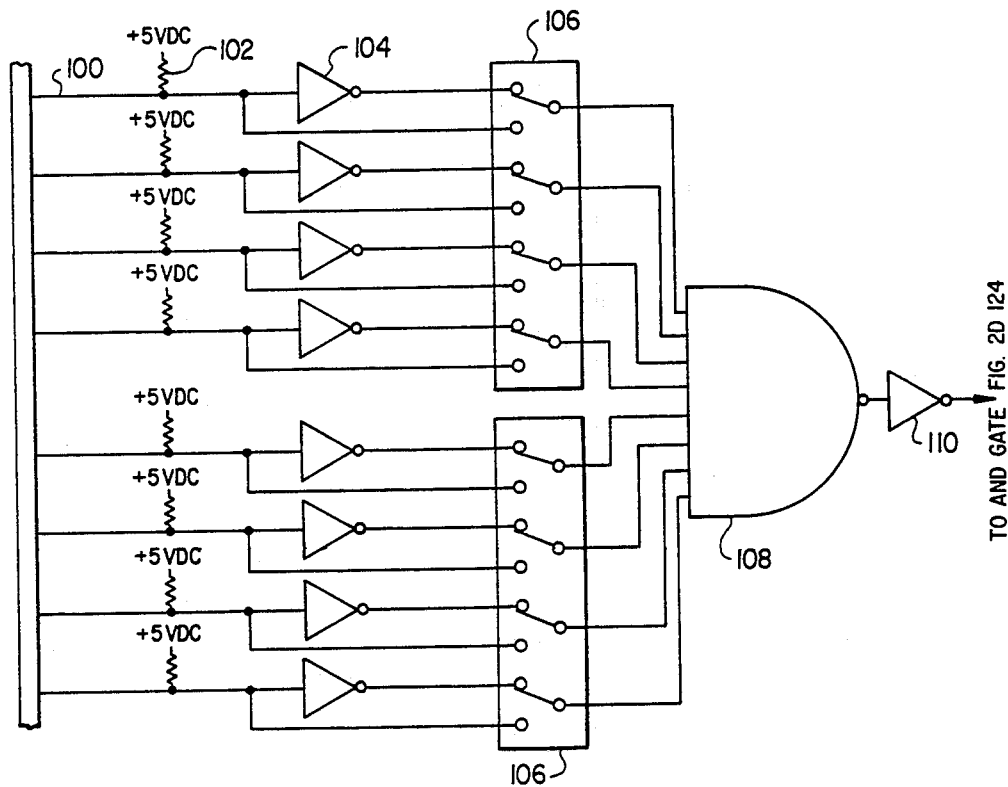
Figure 2C:
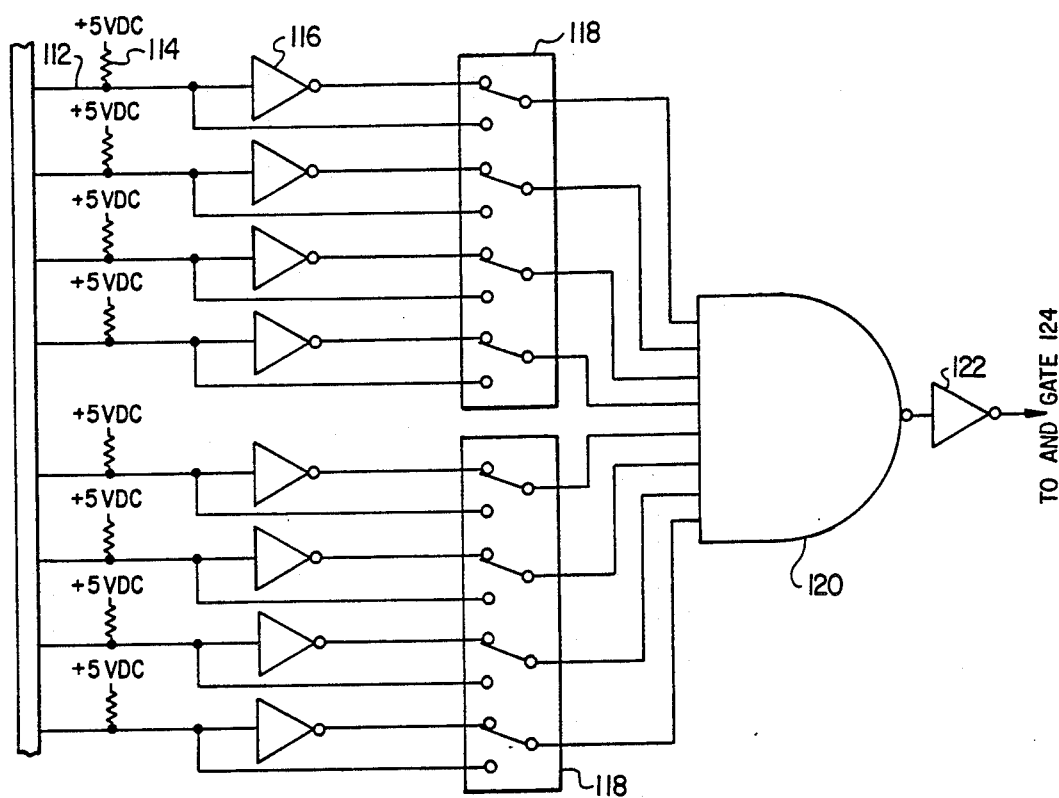
Figure 2D:
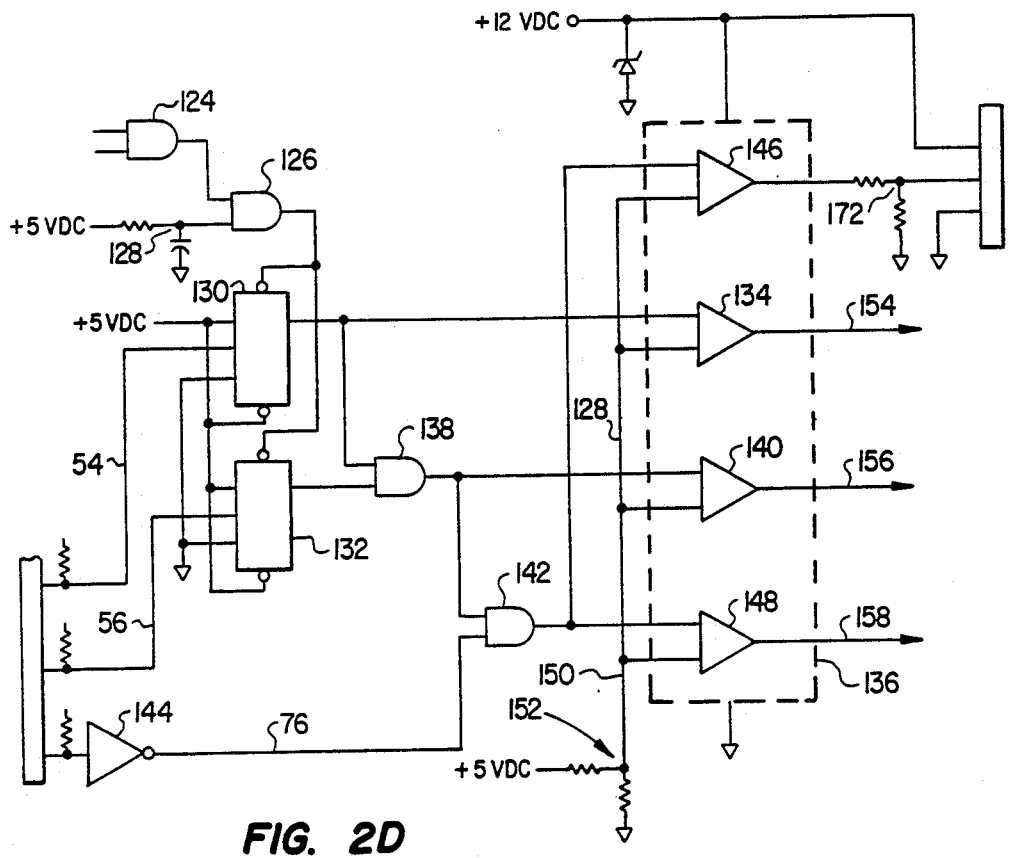
Figure 2E:
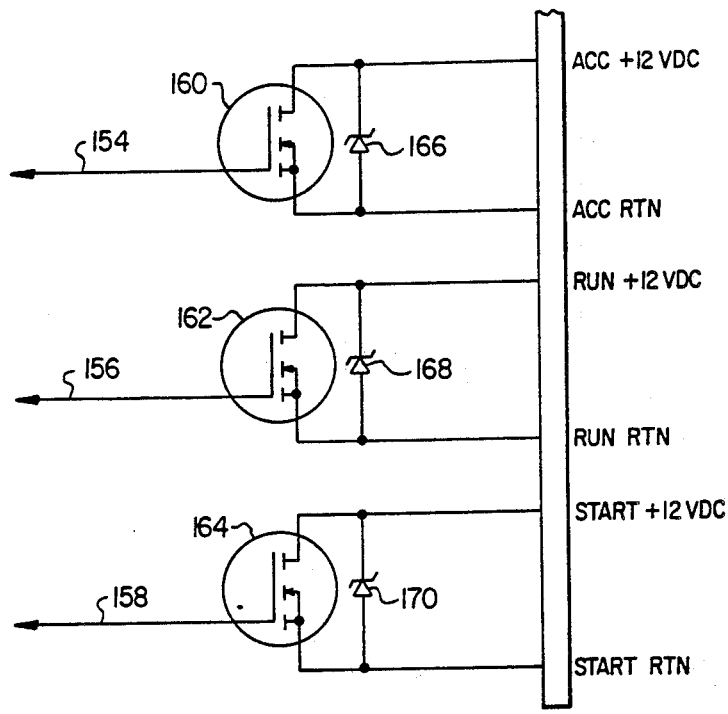

The operation of the decoding circuit 18 is substantially that of FIG. 1 down to the NAND gates 108 and 120 and for brevity is not repeated. With the dip switches 106 and 108 positioned as shown in FIGS. 2b and 2c, i.e. the poles are in contact with the second contacts, the preset code has not been entered. Thus, the eight dip switches 106 and 108 can be set to a desired key code by switching the poles selectively to contact either the first or second contacts. The correct code is indicated when logic ones are input to the NAND gates 108 and 120 and the NAND gates output logic zeros to the inverters 110 and 122 for inversion to logic ones. It will be appreciated by those persons skilled in the art that the decoding circuitry can be modified using available AND or NAND gates to accommodate any number of bits.

Control Circuitry

As the correct code is indicated only by a logic one output at both the inverters 110 and 122, the inverters 110 and 122 have their output terminals connected to AND gate 124 (FIG. 2d) for determining a code match. When a match is made, the logic one output signal of AND gate 124 is connected to a second AND gate 126. AND gate 126 has an input connected to an RC filter circuit 128 having its resistor and capacitor connected, respectively, to the 5Vdc source and ground for holding the flip-flop clear line "low" until everything has stabilized after power up. The output terminal of AND gate 126 is connected to the clear terminals of JK flip-flops 130 and 132 for clocking out their stored information and receiving additional information for storage. Suitable flip-flops are provided by an SN54LS112AJ dual JK, negative edge trigger, flip-flop sold by Grayhill Corporation. The J terminals are connected to the +5Vdc power supply and the K terminals are connected to ground. The input terminals are connected, respectively, by leads 54 and 56 to the accessory and on (run) positions of the key receiver switch 14 (FIG. 1) for holding accessory and on position information signals when activated by the key.

The Q output of flip-flop 130 (FIG. 2d) is connected to the junction of a comparator 134 of a quad voltage comparator 136 such as, for example, a LM139AJ sold by Grayhill Corporation, and a first terminal of AND gate 138. The Q output of flip-flop 132 is connected to the second terminal of AND gate 138. The output of AND gate 138 is connected to a comparator 140 and first terminal of AND gate 142. The second terminal of AND gate 142 is connected by lead 76 through an inverter 144 to the start position of the key receiver switch 14 (FIG. 1). The output terminal of AND gate 142 (FIG. 2d) is connected to the junction of comparators 146 and 148. The negative terminals of the comparators 146, 134, 140, and 148 are connected by lead 150 to a reference voltage produced by voltage divider 152 connected to the 5Vdc power source.

Power Switching Circuitry

Figure 2F:
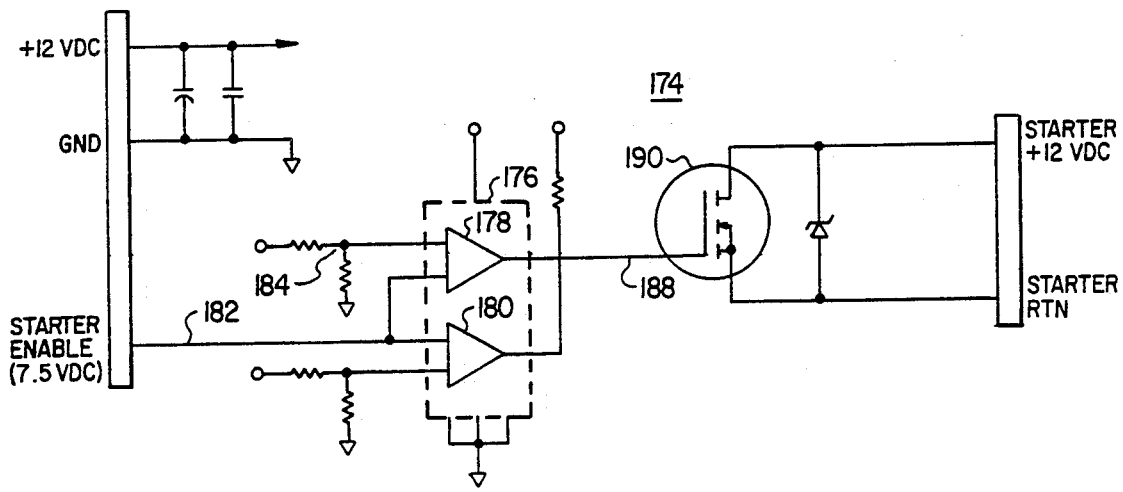

The comparators 134, 140, and 148 have their output terminals connected, respectively, by leads 154, 156, and 158 to power amplifiers 160, 162, and 164 (FIG. 2e) of an IRFZ30 HEXFET sold by IR Corporation. The power amplifiers of the power switching circuitry 22, when biased on, provide working current to existing solenoid operated devices of the vehicle. Zenner diodes 166, 168 and 170 are connected across the power output and return lines of the power amplifiers 160, 162, and 164. The Zenner diodes are connected as close to the power amplifiers as possible to protect them from unwanted transient voltages. The comparator 146 is connected through a voltage divider 172 for applying a unique voltage (7.5Vdc) to a serial enable circuit 172 (FIG. 2f).

Serial Enable Circuit

The serial enable circuit 174 (FIG. 2f) includes a dual comparator 176 such as an LM 119J sold by Motorola Corporation. Comparator 178 has its negative terminal and comparator 180 has its positive terminal connected by lead 182 to the 7.5Vdc unique voltage output of comparator 146 and voltage divider 172. While, the positive terminal of comparator 178 is connected to a voltage divider 184 which produces an eight Vdc from the 12Vdc power source for comparison with the 7.5Vdc at the negative terminal of comparator 178. While, the negative terminal of comparator 180 is connected to a voltage divider 186 which produces a seven Vdc for comparison with the 7.5Vdc at the positive terminal of comparator 180. The comparator 176 thus receives the unique voltage and if between seven and eight Vdc outputs if for biasing on a starter power transistor switch 190. Thus, the output of the comparator 176 is connected by lead 188 to the power transistor 190 of the IRFZ30 HEXFET. The power transistor 190 is connected to the vehicles starter solenoid leads for connecting power thereto for activating the starter. A Zenner diode 192 is connected across the power and power return leads 194 and 196 close to the transistor 190 to protect it from transient voltages. It will be appreciated that a manufacturer can vary the unique voltage from unit to unit to enhance the uniqueness of the serial enable circuit. Also, the voltage sensing domain can be replaced by fiber optic, frequency or other electrical domains by one skilled in the art.

The mode status feature for the sixteen bit code switch is identical to that of the FIG. 1 structure and therefore has not been repeated.

Electrical Control Unit Operation

The operation of the electrical control unit 18 (FIGS. 2a-2f) will now be described. Flip-flops 130 and 132 store information indicating, respectively, whether the four position vehicle switch 14 has been turned from the off position to the accessory and on positions. When the flip-flop 108 receives a control signal from the decoder circuitry 16 indicating a proper code has been received, the accessory position indicating information is output to the power transistor 134 and to the AND gate 138. The power transistor supplies power for an accessory solenoid; thus, permitting operation of solenoid type accessories in the typical manner. Further, when the flip-flop 132 receives the control signal, the on position information is output to the AND gate 138. The AND gate 138 upon receiving information that the accessory and on positions have been accessed by the key, outputs signals to the on position power transistor 140 and AND gate 142. Only if the accessory position has been made and the on position of the key receiver switch made will the power transistor 140 be activated to provide power for the on (run) solenoid operated device. The AND gate 142 has an input directly connected to the start position of the four way key receiver switch.

Thus, with the AND gate 142 receiving information that the key is in the start position and the accessory and on positions of the switch have been accessed, the AND gate 142 outputs a control signal to the power switch 164 and to the unique signal producing circuit 172. The unique signal circuit produces a signal having a unique voltage for application to the serial enable circuit 174 for identification and application to the transistor switch 190. The transistor 190 controls to connection of the working power for the starter solenoid or other critical circuit.

Although several embodiments of this invention have been described, it will be apparent to a person skilled in the art that various modifications to the details of construction shown and described may be made without departing from the scope of this invention.

What is claimed is:

1. An electrical security system comprising:
   a multiple-position code receiver switch means including means for receiving an operating code and a code sensing means for outputting electrical signals indicative of a received code;
   a first decision making means connected to the code sensing means for comparing the received code to a preset code and outputting a control signal indicative of a matching code to a first action means;
   a first action means connected to the switch positions of the multiple position code receiver switch means for storing information as to positions thereof contacted, and to the first decision making means for receiving a control signal, and a second decision means connected to the first action means for determining responsive to receipt of a control signal by the first action means the sequential positioning of the multiple position switch through its positions and outputting a control signal indicative thereof; and
   a second action means connected to the second decision making means and responsive to a control signal thereof for generating power at a working level for an electrically operated device.

2. An electrical security system according to claim 1 further including means connected to the output of the second decision making means for producing a preselected voltage, a comparator means connected to the preselected voltage for determining whether the voltage received has the preselected voltage, and a switching means connected to the comparator means for connecting a working voltage to the solenoid of the solenoid operated device.

3. An electronic lock security system comprising:
   a multiple position key sensor switch having a code sensing means for sensing a code of a coded key and outputting signals representative thereof;
   a decoding means connected to the code sensing means for comparing the sensed code to a preset code and outputting a control signal indicative of matching codes;
   a switch control means having electronic means connected to a first portion of the multiple position switch positions of the multiple position key receiver switch for remembering the first portion of switch positions being contacted during operation thereof, and responsive to receipt of a control signal from the decoding means for outputting control signals indicative thereof, and logic means including first means connected to the electronic means for receiving the first portion of switch position control signals and second means connected to a second portion of switch positions for receiving a signal from the second portion of switch positions indicative of the second portion of positions being contacted and to the first means for receiving signals indicating the first portion of positions being contacted and outputting a signal indicative of both the first and second portions of the positions being contacted; and a power switch means connected to the second means and responsive to the output signal thereof for supplying power at a working level for a solenoid of a solenoid operated device.

4. An electronic lock security system according to claim 3 further including at least one power switch connected to the first means of the logic means for receiving therefrom a signal for producing power at a working level for a solenoid of a solenoid operated device.

5. An electronic lock security system according to claim 3 further including a circuit enabling means connected between the power switch means and solenoid of a solenoid device and responsive to a preselected electrical domain for connecting the working level power output of the power switch to the solenoid of the solenoid operated device.

6. An electronic lock security system according to claim 5 wherein the circuit enabling means includes a preselected voltage producing means connected to the second means of the logic means for producing a preselected voltage and a comparison means connected to the preselected voltage producing means for determining whether the voltage received is at the preselected voltage, and a switch means connected to the comparator means and responsive to the output signal of the comparator means for connecting the working power to the solenoid of the solenoid operated device.

7. An electronic lock security system according to claim 3 wherein the code sensing means includes a plurality of plunger type operated switches having a plurality of plungers positioned in the multiple position key switch for engaging protrusions of a key having a plurality of code forming protrusions and depressions for closing the protrusion corresponding switches to ground and leaving open the switches corresponding to the key depressions for producing a corresponding plurality of logic ones and zeros are provided for a code.

8. An electronic lock security system according to claim 7 further including a plurality of voltage source means, a corresponding plurality of voltage inverter means, and a corresponding plurality of switch means having first and second contacts selectively closed for forming a preset code, said plurality of voltage source means being connected to the junction of the plurality of plunger type switches of the code sensing means, the plurality of voltage inverter means and first contacts of the plurality of switch means, and said plurality of voltage inverter means being connected to second contacts of the plurality of switch means wherein when the contacts of the plurality of plunger switches are closed to ground, logic zero signals are input to the plurality of inverters for inversion and to the first contacts of the plurality of switches, and when the plunger type switches are open logic one signals are input to the plurality of inverters for inversion and to the first contacts of the plurality of switches, whereby when the plurality of plunger type switches are selectively opened and closed by a coded key a corresponding key code is connected to the plurality of preset switches for comparison with the preset code and if matched a plurality of logic one signals are output, and a multiple input gate means connected to the plurality of switches and responsive to receiving a plurality of logic one signals for outputting a control signal.

9. An electronic lock security system according to claim 8 wherein the multiple input gate means is a multiple input AND gate.

10. An electronic lock security system according to claim 8 wherein the multiple input gate means is a multiple input NAND gate, and further includes an inverter connected to the NAND gate for converting the zero logic output of the NAND gate to a logic one output.

11. An electronic lock security system according to claim 3 wherein the positions of the multiple position key switch include accessory, on, and start positions, and the switch control means includes first and second flip-flops connected, respectively, to the accessory and on positions for storing information signals indicating whether contact has been made therewith and responsive to receipt of a control signal from the decoding means for outputting the information, respectively, to first and second AND gates of the logic means, the first AND gate being connected to the first and second flip-flops for receiving information that the accessory and on positions have been accessed and outputting a control signal for the second AND gate, the second AND gate being connected to the first AND gate for receiving the control signal and to the start position for receiving information signals indicating whether the start position is being accessed and when information signals have been received indicating the accessory and on positions have been accessed and the start position is being accessed for outputting a control signal for the power switch means.

12. An electronic lock security system according to claim 11 wherein the power switch means includes a plurality of power transistors connected, respectively, to the output of the first flip-flop, first AND gate, and second AND gate and responsive to the control signals thereof for producing power at a working level for operating the solenoids of solenoid operated devices.

13. An electronic lock security system according to claim 3 wherein the multiple position key sensor switch code sensing means includes an additional sensor for producing a mode status signal for a central processing unit of a host system, whereby the central processing unit upon receipt of the signal is activated to impose a limitation upon the operation of the host system.

14. An electronic lock security system according to claim 3 wherein the switch control means includes status mode determining means connected to the first portion of switch positions for determining the status mode of the switch positions of the first portion for connection to a central processing unit of a host system for indicating the status thereof to the host system.

* * * * *